(12) United States Patent
Hollensteiner et al.

(10) Patent No.: US 10,040,256 B2
(45) Date of Patent: Aug. 7, 2018

(54) NON-VENTED BLADDER SYSTEM FOR CURING COMPOSITE PARTS

(71) Applicant: The Boeing Company, Chicago, IL (US)

(72) Inventors: William Stahl Hollensteiner, Kent, WA (US); Kurtis S. Willden, Kent, WA (US)

(73) Assignee: The Boeing Company, Chicago, IL (US)

(*) Notice: Subject to any disclaimer, the term of this patent is extended or adjusted under 35 U.S.C. 154(b) by 223 days.

(21) Appl. No.: 15/200,330

(22) Filed: Jul. 1, 2016

(65) Prior Publication Data

US 2016/0311179 A1 Oct. 27, 2016

Related U.S. Application Data

(62) Division of application No. 13/491,698, filed on Jun. 8, 2012, now Pat. No. 9,381,704.

(51) Int. Cl.
*B29C 65/00* (2006.01)
*B29C 33/00* (2006.01)
(Continued)

(52) U.S. Cl.
CPC ............ *B29C 70/446* (2013.01); *B29C 33/10* (2013.01); *B29C 33/405* (2013.01);
(Continued)

(58) Field of Classification Search
CPC ......... B29C 65/00; B29C 65/02; B29C 65/18; B29C 65/483; B29C 65/4835; B29C 33/18; B29C 41/50; B29C 41/46; B29C 43/56; B29C 44/3465; B29C 44/42; B29C 51/10; B29C 66/00145; B29C 66/81455; B29C 66/82421; B29C 66/82423; B29C 66/82661; B29C 70/36; B29C 70/44; B29C 70/443; B29C 70/48; B29C 2043/3605; B29C 2043/3644; B29C 2043/3647;
(Continued)

(56) References Cited

U.S. PATENT DOCUMENTS 4,178,406 A 12/1979 Russell
4,222,721 A * 9/1980 Gado ................. B29D 30/0662
264/315
(Continued)

FOREIGN PATENT DOCUMENTS

WO WO20090020466 A1 2/2009

OTHER PUBLICATIONS

Extended European Search Report, dated Sep. 23, 2013, regarding Application No. 13169023.2, 6 pages.
(Continued)

*Primary Examiner* — Jacob T Minskey
*Assistant Examiner* — Matthew Hoover
(74) *Attorney, Agent, or Firm* — Yee & Associates, P.C.

(57) ABSTRACT

A composite part charge having an internal cavity is placed on a tool and covered by a vacuum bag for autoclave curing. A bladder is placed in the cavity to react autoclave pressure on the charge. The bladder is coupled with a flexible fluid reservoir located beneath the vacuum bag. The bladder is pressurized by autoclave pressure applied through the vacuum bag to the flexible fluid reservoir.

8 Claims, 14 Drawing Sheets

(51) Int. Cl.
*B29C 41/00* (2006.01)
*B29C 43/00* (2006.01)
*B29C 44/00* (2006.01)
*B29C 51/00* (2006.01)
*B29C 70/44* (2006.01)
*B29C 33/10* (2006.01)
*B29C 33/40* (2006.01)
*B29C 33/48* (2006.01)
*B29C 33/50* (2006.01)
*B29C 43/36* (2006.01)
*B29C 65/78* (2006.01)
*B29K 105/06* (2006.01)
*B29L 31/30* (2006.01)

(52) U.S. Cl.
CPC .......... *B29C 33/485* (2013.01); *B29C 33/505* (2013.01); *B29C 43/3642* (2013.01); *B29C 65/78* (2013.01); *B29C 2043/3649* (2013.01); *B29K 2105/06* (2013.01); *B29K 2821/00* (2013.01); *B29K 2867/00* (2013.01); *B29L 2031/3076* (2013.01); *Y02T 50/433* (2013.01)

(58) Field of Classification Search
CPC ........ B29C 2043/3649; B29C 2043/56; B29C 2043/561
See application file for complete search history.

(56) References Cited

U.S. PATENT DOCUMENTS

| | | | |
|---|---|---|---|
| 5,366,684 A * | 11/1994 | Corneau, Jr. | B29O 43/3642 156/285 |
| 5,368,807 A | 11/1994 | Lindsay | |
| 8,074,694 B2 | 12/2011 | Brook et al. | |
| 9,381,704 B2 | 7/2016 | Hollensteiner et al. | |
| 2010/0006739 A1 | 1/2010 | Robins et al. | |
| 2010/0009124 A1 | 1/2010 | Robins et al. | |
| 2010/0124654 A1* | 5/2010 | Smith | B29O 43/3642 428/317.9 |
| 2010/0139850 A1 | 6/2010 | Morris et al. | |
| 2013/0327477 A1 | 12/2013 | Hollensteiner et al. | |

OTHER PUBLICATIONS

European Patent Office Communication, dated Aug. 5, 2014, regarding Application No. EP13169023.2, 4 pages.
Office Action, dated Mar. 20, 2014, regarding U.S. Appl. No. 13/491,698, 20 pages.
Office Action, dated Oct. 6, 2014, regarding U.S. Appl. No. 13/491,698, 15 pages.
Final Office Action, dated Mar. 10, 2015, regarding U.S. Appl. No. 13/491,698, 24 pages.
Office Action, dated Jun. 30, 2015, regarding U.S. Appl. No. 13/491,698, 21 pages.
Final Office Action, dated Dec. 4, 2015, regarding U.S. Appl. No. 13/491,698, 22 pages.
Notice of Allowance, dated Mar. 2, 2016, regarding U.S. Appl. No. 13/491,698, 13 pages.
Japanese Notice of Reasons for Rejection and English Translation, dated Feb. 28, 2017, regarding Application No. 2013-119019, 6 pages.
Russian Office Action and English translation, dated Jan. 10, 2018, regarding Application No. 2013125720/05, 13 pages.

* cited by examiner

NON-VENTED BLADDER SYSTEM FOR CURING COMPOSITE PARTS

CROSS-REFERENCE TO RELATED APPLICATION(S)

This application is a divisional of and claims the benefit of priority to U.S. patent application Ser. No. 13/491,698, filed on Jun. 8, 2012, and entitled "Non-Vented Bladder System for Curing Composite Parts", the entire contents of which are incorporated herein by reference.

BACKGROUND INFORMATION

1. Field

The present disclosure generally relates to methods and equipment for fabricating composite resin parts, and deals more particularly with a bladder system used in curing composite parts within an autoclave.

2. Background

Composite resin parts may be cured within an autoclave that applies heat and pressure to the part during a cure cycle. Some part geometries include internal cavities that may cause the part to collapse under autoclave pressure unless a tool such as an inflatable bladder is placed in the cavity to react the autoclave pressure force applied to the part. For example, in the aircraft industry, inflatable bladders may be inserted into the cavities of composite stringer layups that are autoclave cured on mandrel-like cure tools. These bladders are pressurized by venting them to the autoclave pressure.

There are several problems with the vented bladders described above that may lead to inconsistencies in the cured parts. For example, failure to properly vent the bladder may prevent the bladder from becoming pressurized sufficiently to react the applied autoclave pressures. Similarly, insufficient bladder pressurization may result from the failure of sealant tape used to seal a vent hole coupling the bladder with an outside vent. It is also possible for a bladder wall to fail or be penetrated, in which event autoclave gases may be forced into the part throughout the cure cycle. These issues may be particularly problematic where a relatively large number of stringers are cocured at the same time with other parts. For example, where a number of stringers are cocured with a fuselage skin, each of the bladders placed in the stringers is a potential source of leakage into the cocured structure that may cause the entire structure to be scrapped or extensively reworked.

Accordingly, there is a need for a non-vented bladder system that may reduce or eliminate the adverse effects resulting from leaks in the bladder or failure to properly pressurize the bladder. There is also a need for a bladder system and curing method that does not require venting to autoclave pressure, and which may eliminate the need for bladder vent hole seals.

SUMMARY

The disclosed embodiments provide a non-vented bladder system that may substantially reduce or eliminate inconsistencies in cured parts due to bladder leakage, seal leakage and/or or failure of a bladder to properly vent to autoclave pressures. The disclosed system may reduce product scrap and/or the need for rework. Additionally, the disclosed method and non-vented bladder system may reduce labor costs and improve production flow. The embodiments eliminate the need for use of a sealant tape around a vent hole in the bladder. A fluid reservoir is permanently attached to the bladder vent hole and is sealed beneath a vacuum bag, thereby eliminating leak paths around the bladder vent. The reservoir pressurizes the bladder cavity when the autoclave is pressurized. In the event of a leak in the bladder, only the volume of the bladder is leaked into the part.

According to one disclosed embodiment, apparatus is provided for use in autoclave curing of a composite part charge having an internal cavity. The apparatus comprises a flexible bladder adapted to be placed in the cavity for applying pressure on the composite part charge during the curing, and a reservoir of fluid for pressuring the bladder, the reservoir and the bladder being coupled together in a closed system. The apparatus may further comprise a flexible bag sealed over the flexible bladder and the fluid reservoir, wherein the flexible bag is in face-to-face contact with the fluid reservoir and transmits pressure from the autoclave to the fluid reservoir. The apparatus may also comprise a cure tool adapted to have the composite part charge placed thereon, and wherein the fluid reservoir is located on the cure tool and the flexible bag is sealed to the cured tool. The fluid reservoir is flexible. The bladder includes a vent hole, and a portion of the fluid reservoir is attached to the bladder and includes a fluid outlet coupled with the vent hole in the bladder. The fluid reservoir may include a vacuum port sealed beneath the flexible bag adapted to be coupled with a vacuum source for selectively relieving pressure within the fluid reservoir after the composite charge has been cured. The bladder includes a septum forming an interior chamber within the bladder, and a fill material filling the interior chamber which has a density that is sufficient to stiffen the bladder when the bladder is pressured by fluid from the fluid reservoir. The septum includes a flexible side that is exposed to fluid from the fluid reservoir. The flexible side flexes to apply pressure to the fill material when the fluid reservoir pressurizes the bladder.

According to another disclosed embodiment, a non-vented bladder system is provided for use in autoclave curing a composite part charge. The non-vented bladder system comprises a bladder adapted to apply pressure to the composite part charge, and a flexible fluid reservoir adapted to contain a quantity of fluid and compressible by pressure applied by the autoclave for supplying fluid pressure to the bladder, wherein the fluid reservoir is coupled with the bladder in a closed fluid system that is not vented to the autoclave. The fluid reservoir is attached to the bladder. The fluid reservoir includes a fluid outlet, and the bladder includes a vent hole coupled with the fluid outlet. The bladder includes flexible septum exposed to fluid from the fluid reservoir forming an internal chamber within the bladder, and a fill material within the internal chamber for stiffening the bladder.

In another embodiment, apparatus is provided for applying substantially uniform external air pressure on an uncured part having an internal cavity. The apparatus comprises a tool adapted to have the part placed thereon, a bladder adapted to be placed within the internal cavity and in contact with the part, the bladder being adapted to be pressurized with a fluid, a reservoir of the fluid coupled with the bladder, and a flexible bag sealed to the tool and covering the part, the bladder and the reservoir. The reservoir is attached to the bladder to form a single assembly that may be installed in and removed from the internal cavity. The reservoir includes flexible walls in face-to-face contact with the flexible bag allowing the external pressure to be applied to the reservoir through the flexible bag. The bladder includes fill material for stiffening the bladder, and a septum separating the fill material from the reservoir fluid. The reservoir and the bladder form a closed fluid system that is not vented to the external pressure.

According to still another embodiment, a method is provided of autoclave curing a composite part charge having an internal cavity. The method comprises placing the composite part charge on a tool, installing a bladder within the cavity, coupling the bladder with a reservoir of fluid, sealing a flexible bag over the part and the reservoir, and using the flexible bag to transmit autoclave pressure to the reservoir to force fluid from the reservoir into the bladder. Coupling the bladder with the reservoir includes attaching the bladder to the reservoir before the bladder is installed in the cavity. Sealing the bag includes sealing the bag to the tool. The method may further comprise stiffening the bladder by filling the bladder with a fill material, and separating the fill material from the fluid by placing a septum in the bladder. The method may also comprise using a vacuum to draw the flexible bag down against sides of the reservoir.

According to a further embodiment, a method is provided of autoclave curing a composite part charge having an internal cavity. The method comprises supporting the composite part charge within the autoclave, and pressurizing a bladder within the internal cavity using autoclave pressure to force fluid from a fluid reservoir into the bladder. Using the autoclave pressure to force the fluid from the fluid reservoir into the bladder includes evacuating a vacuum bag sealed over the fluid reservoir, and using the bag to transmit the autoclave pressure to the fluid reservoir.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
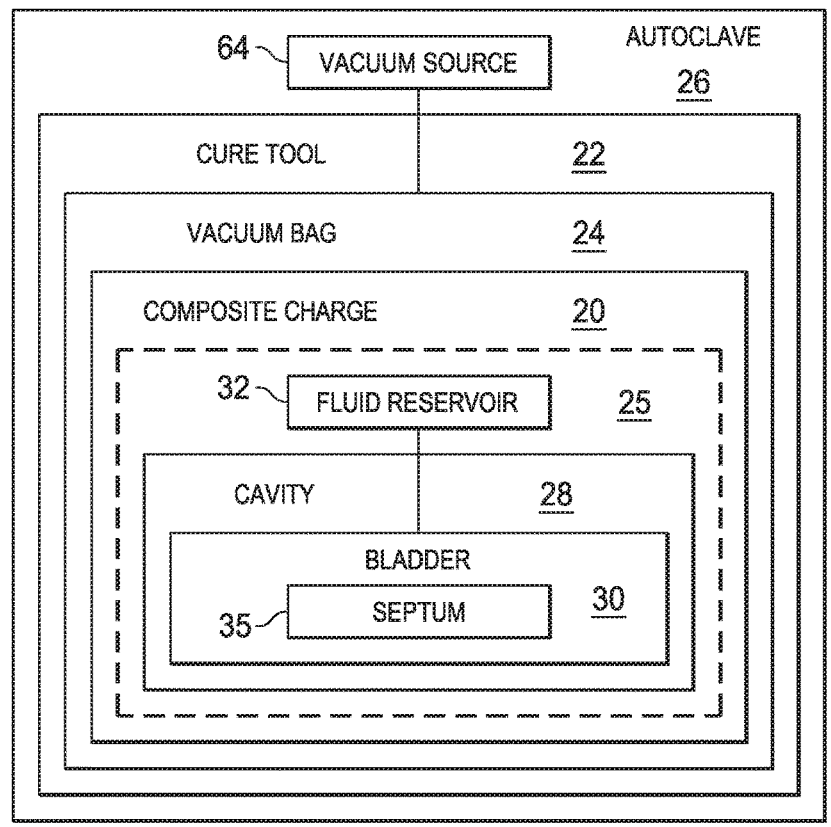
FIG. 1 is an illustration of a functional block diagram of a non-vented bladder system according to the disclosed embodiments.

Referring first to FIG. 1, an uncured composite resin part 20, hereafter referred to as a "charge", a "composite charge", a "composite part charge" or a "stringer charge", is cured on a cure tool 22 placed in an autoclave 26 in which autoclave heat and pressure are applied to the composite charge 20. The composite charge 20 includes one or more internal voids, trapped or enclosed areas, or cavities, which for ease of description, will collectively be referred hereinafter as a cavity 28. A flexible, inflatable bladder 30 is placed within the cavity 28 prior to a cure cycle in order to react autoclave pressures applied to the charge 20 during curing. A flexible fluid reservoir 32 is mounted on the cure tool 22 and is coupled with the bladder 30 in an manner that forms a closed bladder system 25 which is not vented to the atmosphere within the autoclave 26. In other words, the bladder 30 and the fluid reservoir 32 form a closed fluid system that is not directly exposed to the internal atmosphere of the autoclave 26. A flexible bag, such as a vacuum bag 24, is placed over and sealed to the cure tool 22, covering the composite charge 20, the bladder 30 and the fluid reservoir 32. The flexible bag 24 is adapted to be coupled with a suitable vacuum source 64 for evacuating the flexible bag 24. During curing, the bladder 30 is pressurized using a substantially non-compressible fluid (not shown) supplied from the fluid reservoir 32.

As will be discussed in more detail below, because both the bladder 30 and the fluid reservoir 32 are located beneath the vacuum bag 24, the bladder 30 is not vented to the internal atmosphere of the autoclave 26, i.e. the bladder 30 is non-vented. Rather, the combination of the bladder 30 and the fluid reservoir 32 form a closed, non-vented bladder system 25 that is controlled by autoclave air pressure exerted on the vacuum bag 24. Optionally, the bladder 30 may include an internal septum 35 that separates substantially the full internal volume of the bladder 30 from the fluid supplied from the fluid reservoir 32. Reduction of the pressure within the fluid reservoir 32 allows the bladder 30 to partially collapse slightly, thereby preventing the bladder 30 from becoming "locked" in the composite charge 20 and facilitating easy removal of the bladder 30 from the cured composite charge 20.

Figure 2:
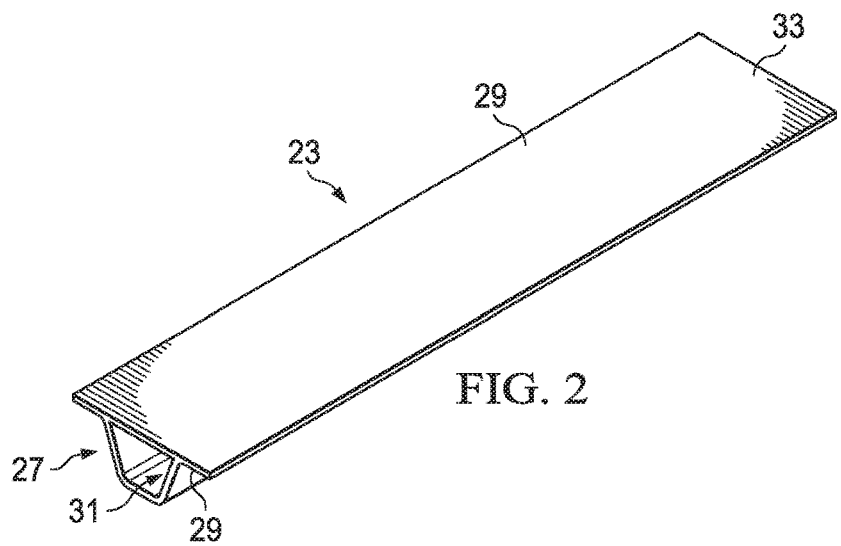
FIG. 2 is an illustration of a perspective view of a composite resin stringer cured using the non-vented bladder system shown in FIG. 1.

Referring now to FIG. 2, the disclosed non-vented bladder system and curing method may be employed to cure any of a variety of composite resin parts of various geometries, having one or more internal cavities. For example, and without limitation, the disclosed system and method may be used in the fabrication of a fiber reinforced composite resin stringer 23, which may comprise a multi-ply layup of prepreg. The stringer 23 includes a hat section 27 forming an internal cavity 31, a pair of laterally extending flange sections 29 and a substantially flat skin section 33 that is consolidated together with the flange sections 29 during curing. Other stringer geometries are possible.

Figure 3:
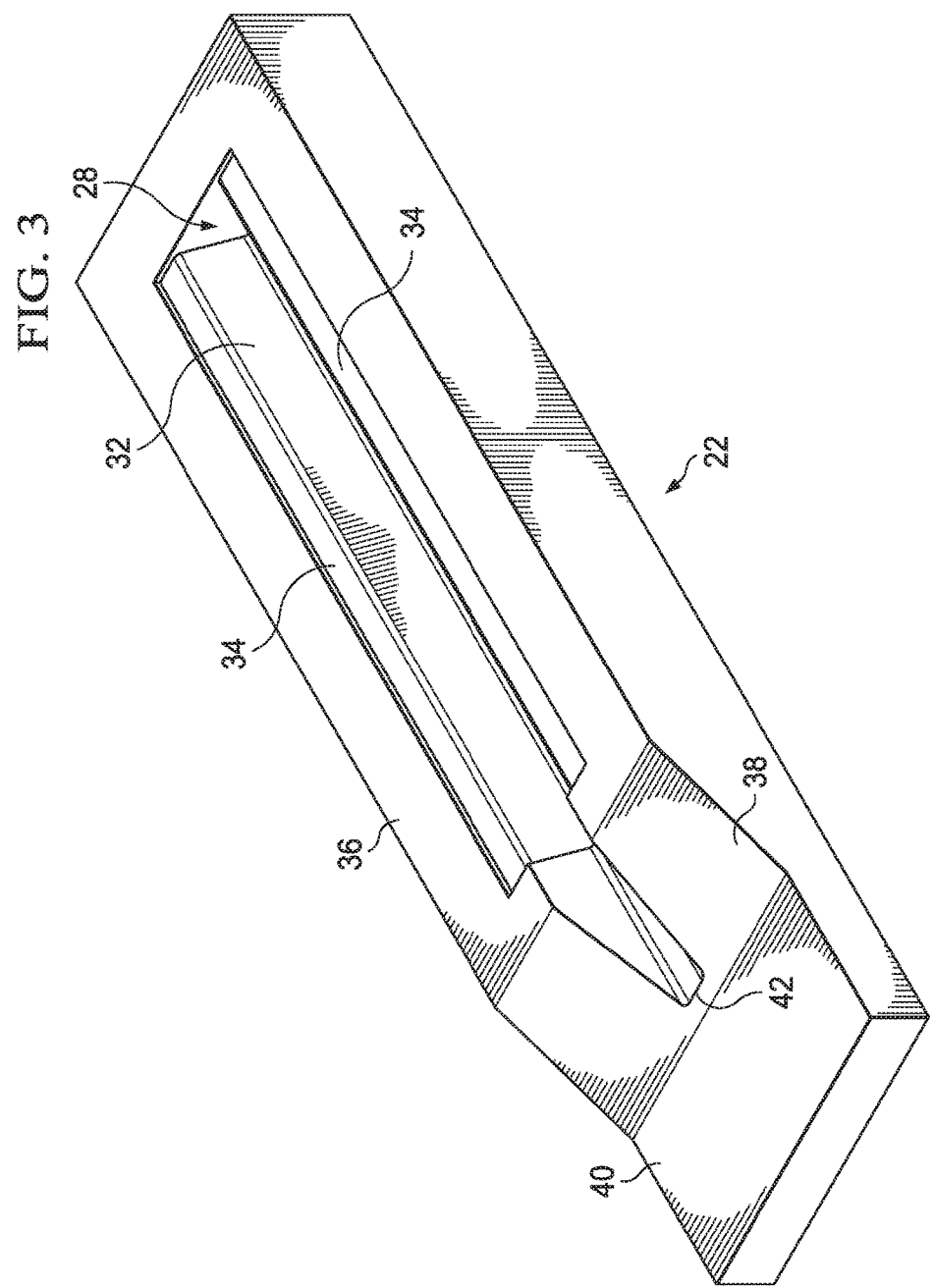
FIG. 3 is an illustration of a perspective view of a cure tool used in curing a composite stringer charge.

FIGS. 3-10 respectively illustrate successive stages in the preparation of the apparatus shown in FIG. 1 for curing of the stringer 23 shown in FIG. 2. Referring particularly to FIG. 3, a cure tool 22 made of any suitable material includes an internal cavity 28 defining a hat section tool face 32, and a pair of laterally extending, flange section tool faces 34. Tool faces 32, 34 are configured to respectively match the geometry of the hat section and flange sections 27, 29 respectively of the stringer 23. The cure tool 22 has a substantially flat upper tool surface 36 surrounding the internal cavity 28, a chamfered surface 38 at one end of the cavity 28, and a substantially flat end section 40. One end of the internal cavity 28 is open at 42. As will be discussed below, the cure tool 22 may be used to assemble composite stringer charges, and to cure the assembled charges within an autoclave 26 (FIG. 1). While the illustrated cure tool 22 has a geometry that is adapted to match features of the stringer 23, it should be noted that the disclosed non-vented bladder system 25 may be used with cure tools having any of various other geometries, depending on the application and the particular composite part charge to be cured.

Figure 4:
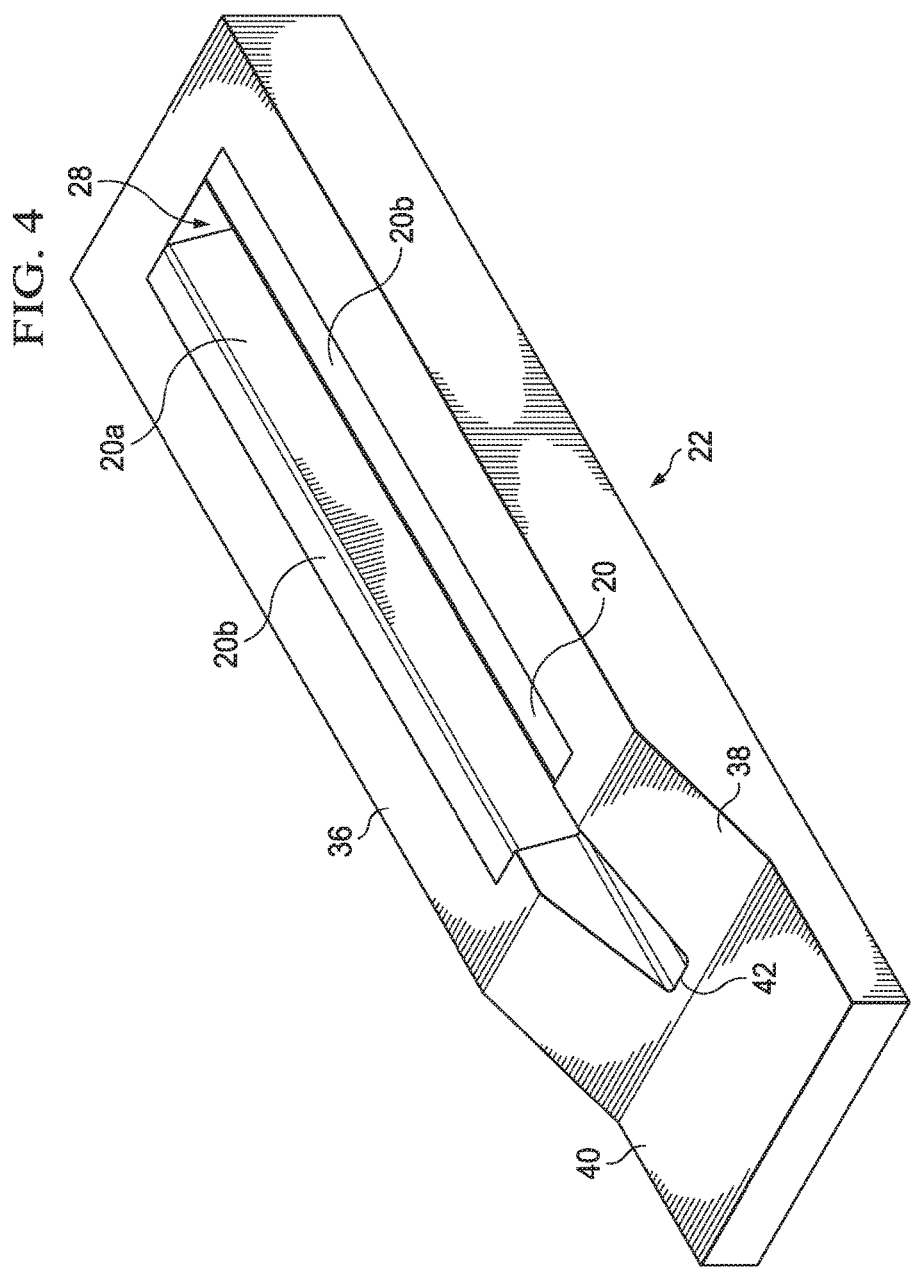
FIG. 4 is an illustration similar to FIG. 3 but showing a stringer charge having been placed on the tool.

Referring to FIG. 4, a composite stringer charge 20 is placed on the cure tool 22. The stringer charge 20 comprises a hat 20a filling the cavity 28 and engaging the tool face 32 (FIG. 3), and a pair of laterally extending flanges 20b respectively engaging the tool faces 34. The stringer charge 20 may be laid up on a separate layup tool (not shown) and then transferred to the cure tool 22, or alternatively, depending on the geometry of the part charge, it may be possible to layup the stringer directly on the cure tool 22.

Figure 5:
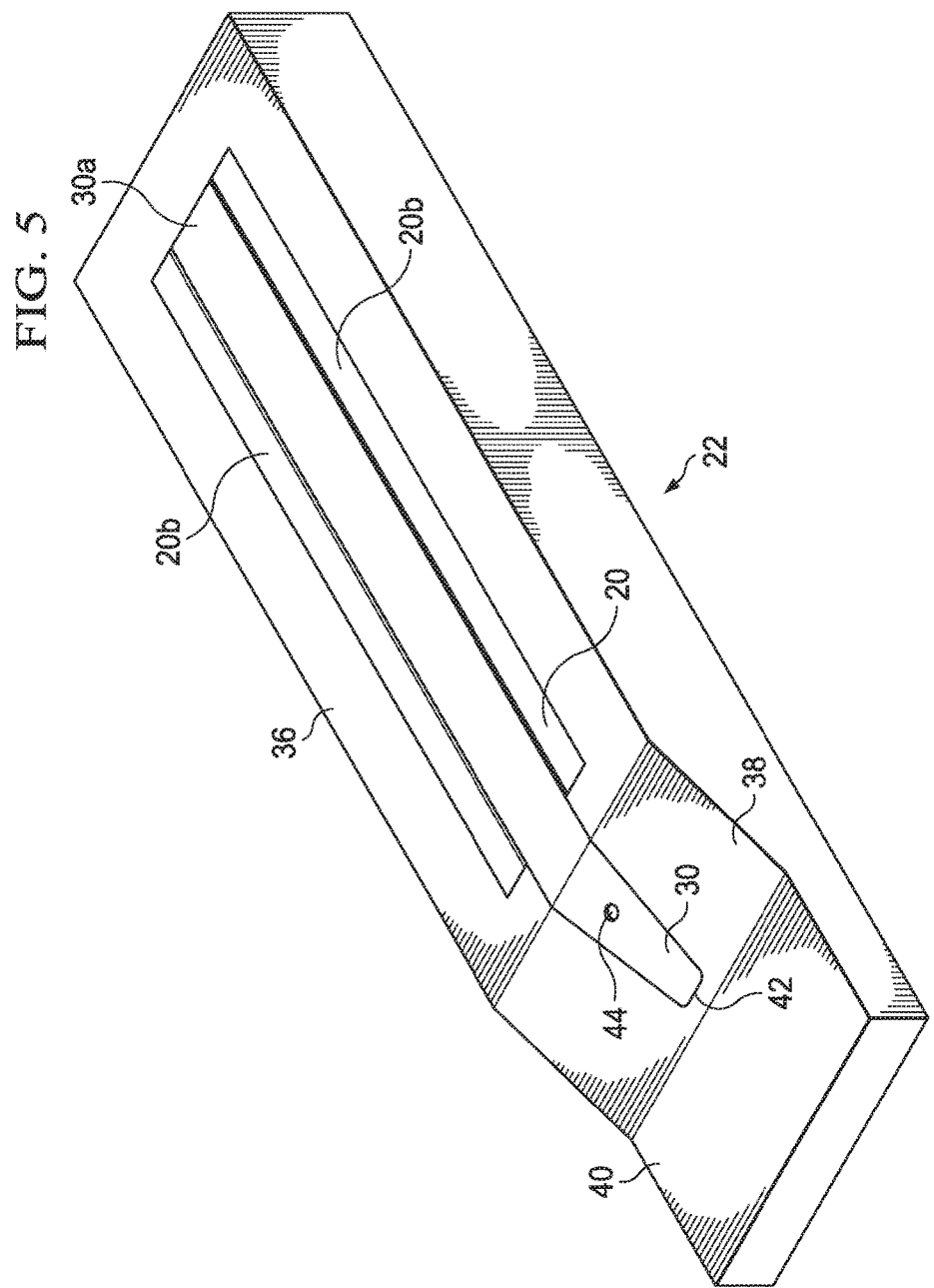
FIG. 5 is an illustration similar to FIG. 4 but showing an inflatable bladder having been placed within the cavity of the stringer charge.

Referring now to FIG. 5, after the stringer charge 20 has been placed in the cure tool 22, a flexible bladder 30 is placed within the cavity 28 (FIG. 4) of the stringer charge 20 in order to react autoclave pressures that are applied during a curing cycle. The bladder 30 may be formed of any suitable material such, for example and without limitation, an elastomer. A release agent may be applied to the bladder 30 before it is installed to facilitate later removal of the bladder from the cavity 28 following curing. The bladder 30 includes a bladder vent hole 44 that is adapted to be coupled with the fluid reservoir 32 shown in FIG. 1, as will be discussed below. In this example, the bladder 30 is configured to substantially match the geometry of the cavity 28 and has a substantially flat upper surface 30a that is substantially flush with the flat tool surfaces 36 of the cure tool 22.

Figure 6:
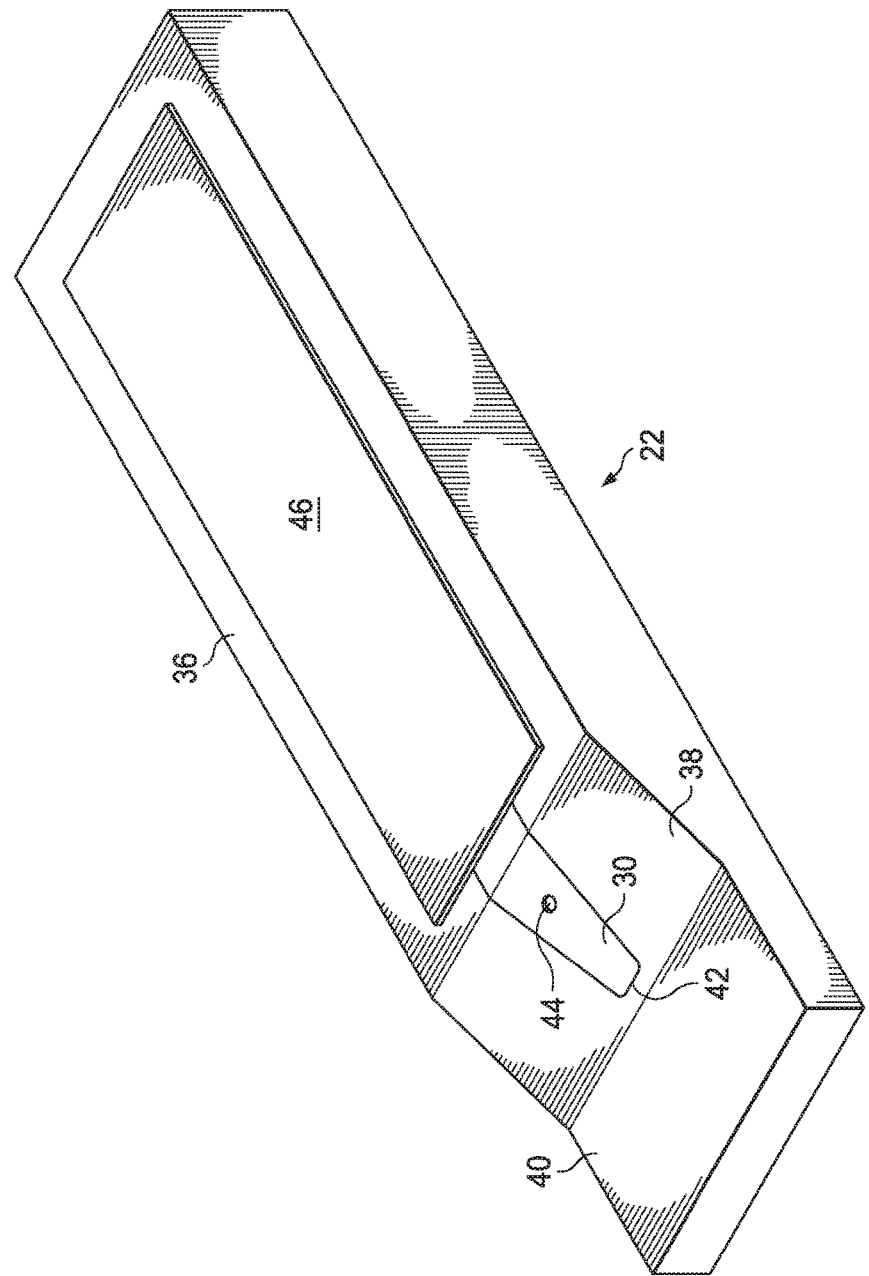
FIG. 6 is an illustration similar to FIG. 5 but additionally showing a skin charge having been placed on the stringer charge.
Figure 7:
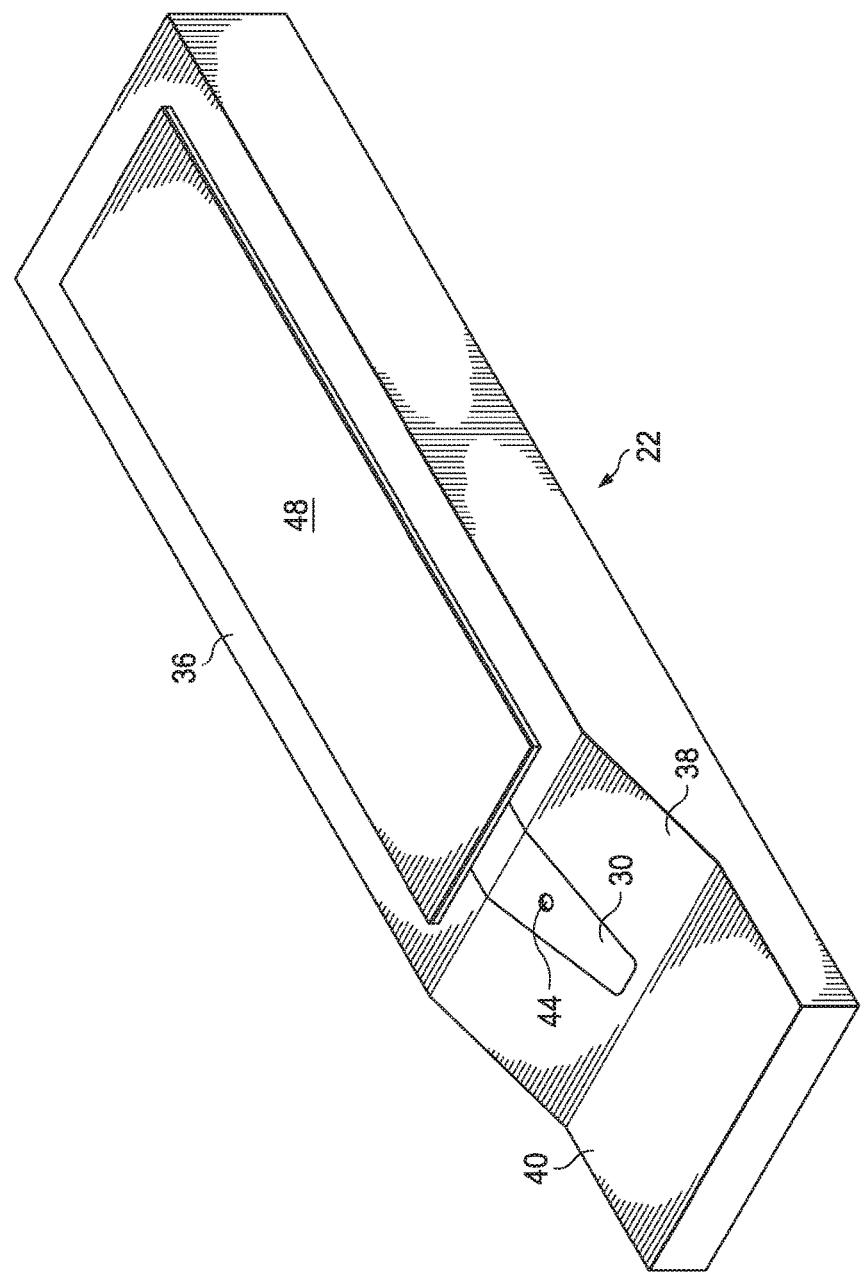
FIG. 7 is an illustration similar to FIG. 6 but showing a caul plate having been installed over the skin charge.
Figure 8:
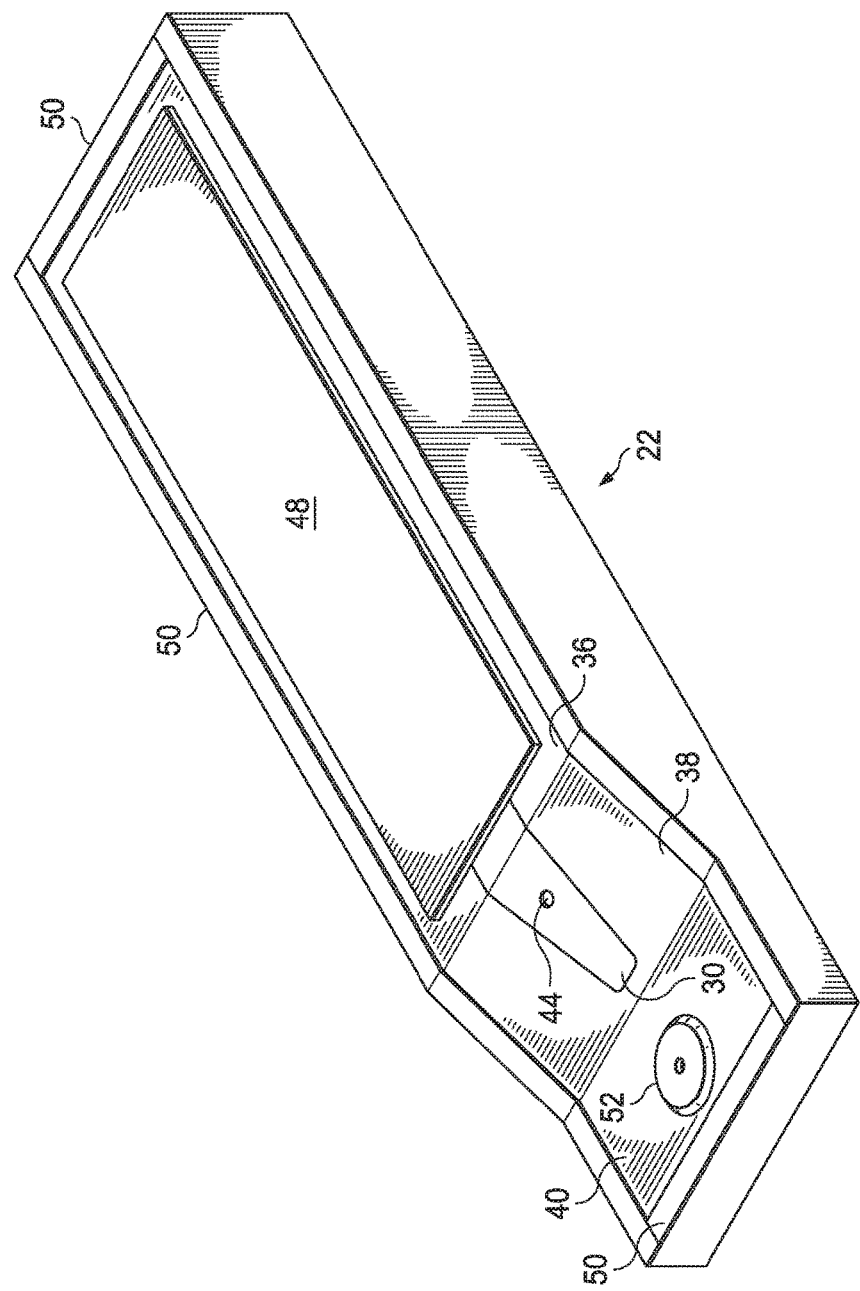
FIG. 8 is an illustration similar to FIG. 7 but showing sealant tape having been applied around the periphery of the cure tool.

Referring now to FIG. 6, after the bladder 30 has been installed as shown in FIG. 5, a substantially flat composite skin charge 46 is placed on the cure tool 22, overlying the bladder 30 and in face-to-face contact with the flanges 20b (FIG. 5) of the stringer charge 20 and the flat tool surfaces 36. Next, as shown in FIG. 7, a caul plate 48 may be installed over the flat composite skin charge 46 in order to apply substantially even pressure over the skin charge 46 during the curing process. Also, although not shown in FIG. 7, peel plies, release films and/or breathers or other components may be installed along with the caul plate 48, depending on the application. As shown in FIG. 8, a suitable sealant tape 50 or other suitable sealant is applied to the perimeter of the cure tool 22 in preparation for vacuum bagging the tool 22. At this point, a vacuum probe base 52 may be applied to the flat end section 40 of the cure tool 22.

Figure 9:
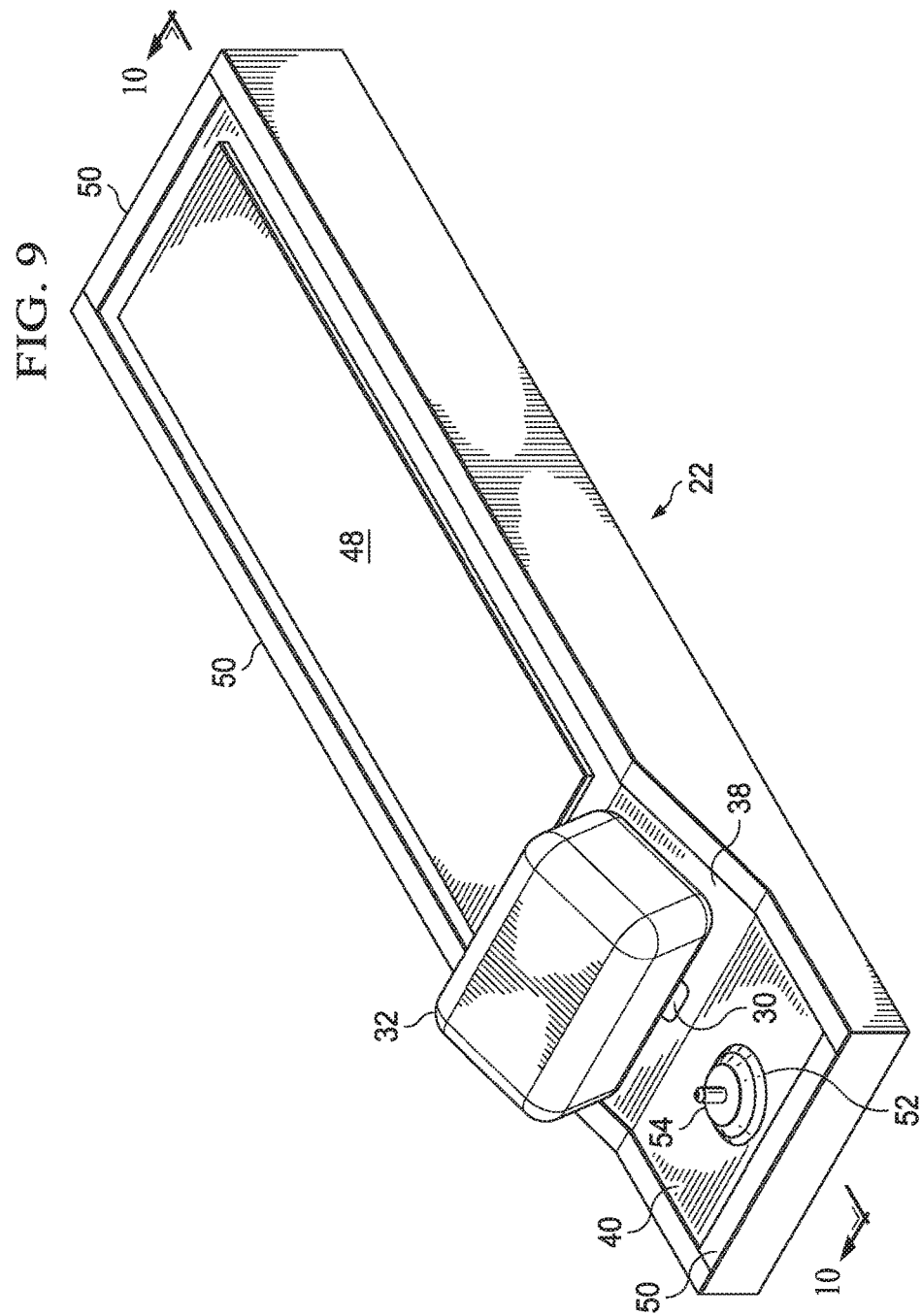
FIG. 9 is an illustration of a perspective view of one end of the cure tool shown in FIG. 8, a flexible fluid reservoir having been installed on the cure tool and coupled with the flexible bladder.

Next, as shown in FIG. 9, a flexible fluid reservoir 32 is attached to the bladder 30 such that the bladder 30 and the fluid reservoir 32 may be installed and removed as a single assembly, if desired. The fluid reservoir 32 is coupled with the vent hole 44 (FIG. 8) in the bladder 30 and is supported on the chamfered surface 38 of the cure tool 22 when the bladder 30 is in place within the composite charge cavity 28. The fluid reservoir 32 may be permanently attached and sealed to the bladder 30, thus obviating the need to reconnect the bladder 30 to a pressure source each time the bladder 30 is installed in a composite charge 20 in preparation for a curing process. This arrangement also eliminates the need for placing a sealant around the vent hole 44 each time the bladder is installed in a composite charge 20. The fluid reservoir 32 may be fabricated from any suitable material such as, without limitation, an elastomer. A vacuum probe 54 is mounted on the vacuum probe base 52, and is adapted to be coupled with a vacuum source (not shown) for evacuating the vacuum bag 24 during a cure cycle.

Figure 10:
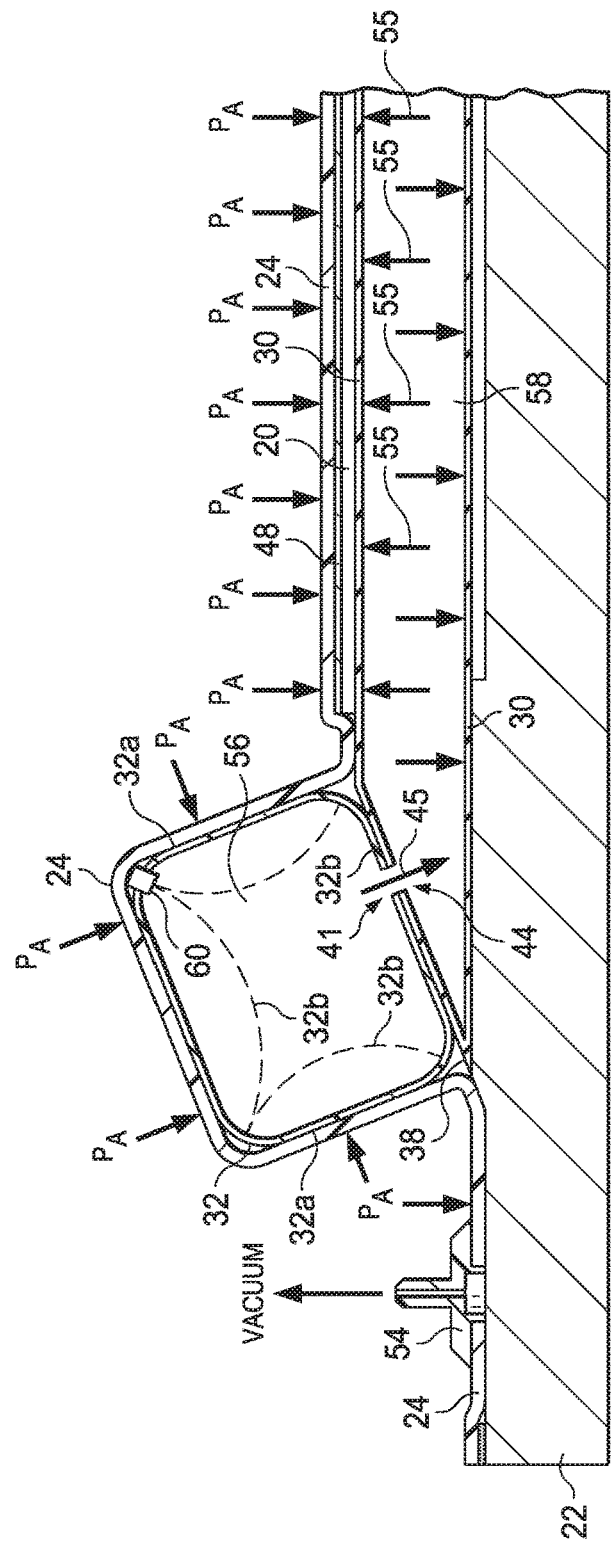
FIG. 10 is an illustration of a sectional view taken along the line 10-10 in FIG. 9, but additionally showing a vacuum bag having been installed over and sealed to the cure tool.

Referring now to FIG. 10, the fluid reservoir 32 may have a generally rectangular or square cross sectional shape with sides 32a that are flexible and may plastically deform inwardly as shown by the dashed lines 32b when external pressure is applied to the fluid reservoir 32. A portion 32b of the fluid reservoir 32 is attached in face-to-face contact to one end of the bladder 30 and includes a fluid outlet 41 that is aligned and coupled with the vent hole 44 in the bladder 30, allowing fluid to flow between the fluid reservoir 32 and the bladder 30. In other embodiments, the fluid reservoir 32 may have a different shape, and may or may not be attached to the bladder 30. Following installation of the fluid reservoir 32 shown in FIG. 9, flexible bag 24, sometimes referred to as a vacuum bag 24, formed of any suitable material such as polyester or nylon, is installed over the tool 22, covering the fluid reservoir 32, the stringer charges 20, 46, and the bladder 30. The vacuum bag 24 is in face-to-face contact with the fluid reservoir 32. The vacuum bag 24 is sealed to the periphery of the cure tool 22 and around the vacuum probe 54 using sealing tape 50 or other suitable sealants. Evacuation of vacuum bag 24 draws the vacuum bag 24 down in face-to-face contact with the sides of the fluid reservoir 32, allowing autoclave pressure $P_A$ to be applied to the fluid reservoir 32.

Optionally, the fluid reservoir 32 may include a vacuum port 60 that is adapted to be coupled with a vacuum source (not shown) after the vacuum bag 24 has been removed following a cure cycle. The vacuum port 60 is closed and sealed beneath the vacuum bag 24 during curing, but includes a valve or other device (not shown) that allows connection of the internal volume 56 of the fluid reservoir 32 to the vacuum source after curing is completed and the vacuum bag has been removed. Coupling the fluid reservoir 32 to the vacuum source in this manner relieves fluid pressure within the fluid reservoir 32, which in turn reduces the pressure within the bladder 30, allowing the bladder 30 to deflate or collapse slightly. Deflation of the bladder 30 in this manner reduces the maximum cross sectional dimension (not shown) of the bladder 30 an amount that is sufficient to allow the bladder 30 to be removed from the cured stringer.

During curing carried out within an autoclave, autoclave pressure $P_A$ forces the vacuum bag 24 against the cure tool 22, thereby compacting the composite charge 20 while also applying pressure to the fluid reservoir 32. The autoclave pressure $P_A$ applied to the fluid reservoir 32 causes fluid to flow 45 from the internal volume 56 of the fluid reservoir 32 through the bladder vent hole 44 into the bladder 30, thereby internally pressurizing the bladder 30. This pressurization of the bladder 30 causes a force 55 to be applied to composite charge 20 that reacts the autoclave pressure $P_A$ applied to the composite charge 20. When curing is completed, the autoclave pressure $P_A$ is removed from the vacuum bag 22, and thus is removed from the fluid reservoir 32. The resulting decrease in fluid pressure within the fluid reservoir 32 allows fluid to flow from the bladder 58 through the vent hole 44 back into the fluid reservoir 32.

As previously discussed, the fluid reservoir 32 may be permanently sealed to the bladder 30, thus obviating the need to place a sealant around the vent hole 44 (FIG. 8) each time the bladder 30 is installed in a composite charge 20. Permanently sealing the fluid reservoir 32 to the bladder 30 may therefore eliminate leakage around the vent hole 44 into the composite charge 20. In the event of a leak in either the bladder 30 or the fluid reservoir 32, fluid leakage into the composite charge 20 is limited to the total volume of the bladder 30 and the fluid reservoir 32 since the bladder system 25 (FIG. 1) is a closed system and does not allow air from the autoclave to enter into the composite charge cavity 28 (FIG. 4).

Figure 11:
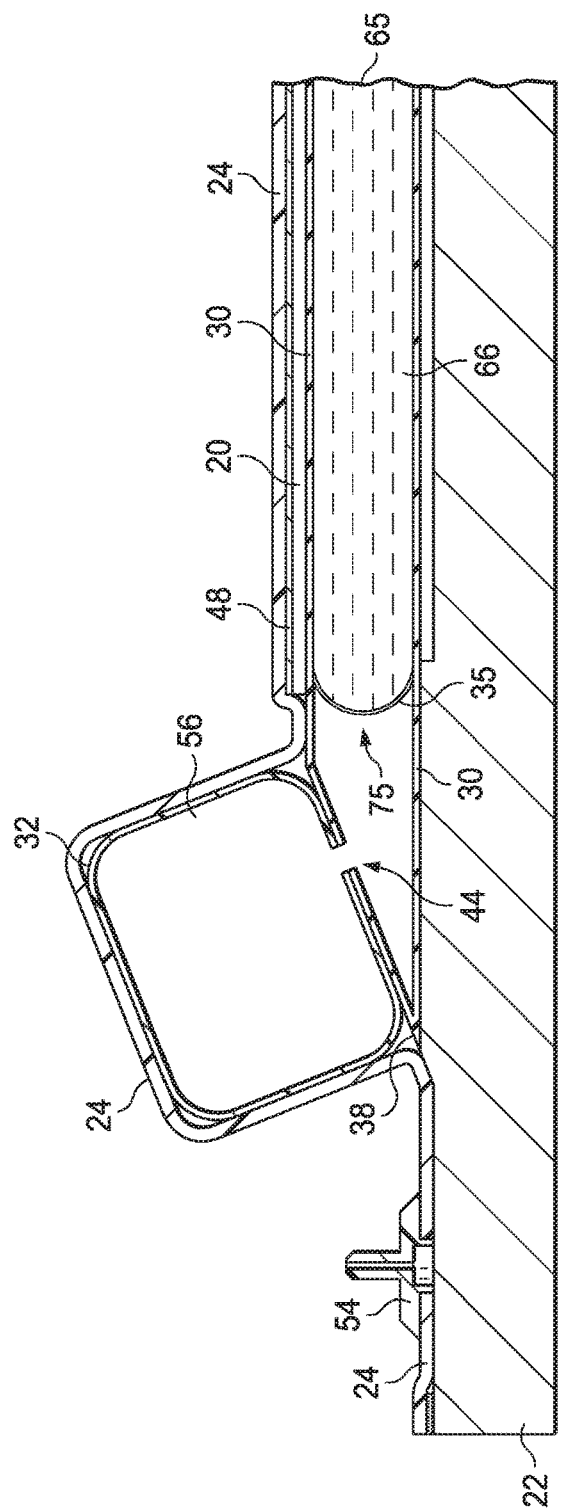
FIG. 11 is an illustration of a sectional view similar to FIG. 10 but showing an alternate embodiment employing a septum within the bladder, the bladder being shown in its unpressurized state.
Figure 12:
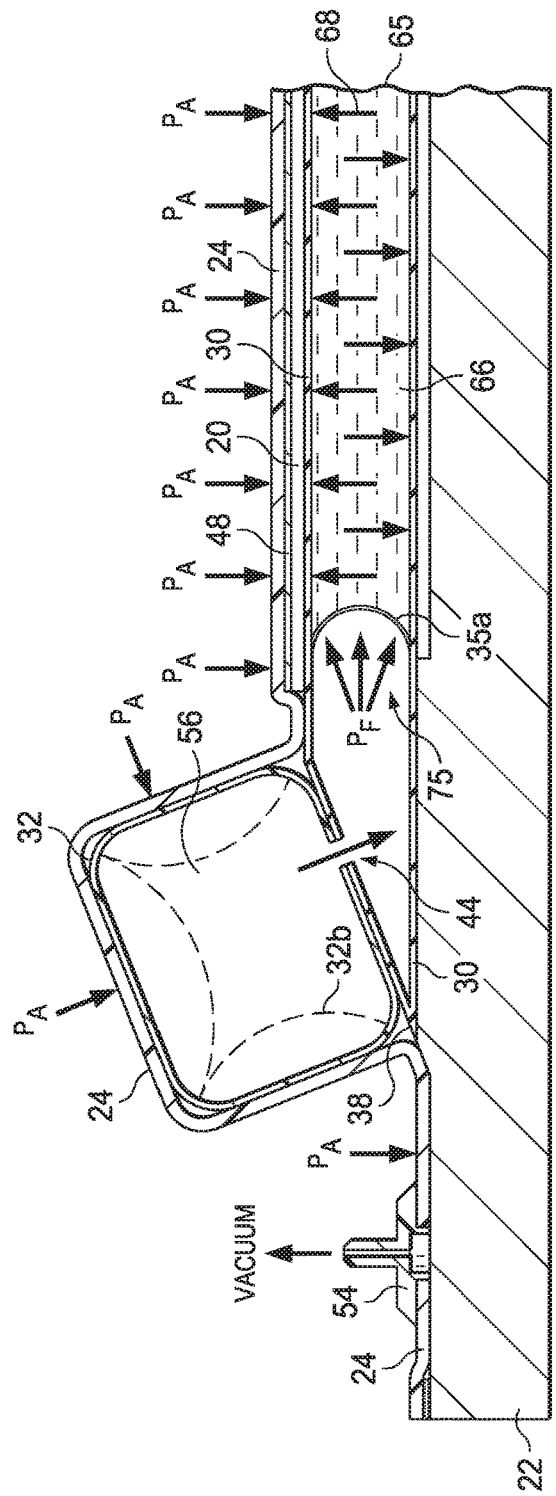
FIG. 12 is an illustration similar to FIG. 11 but showing the bladder having been pressurized through autoclave pressure applied to the fluid reservoir through the vacuum bag.

An alternate embodiment of the disclosed non-vented bladder system is shown in FIGS. 11 and 12. In this embodiment, the bladder 30 includes an internal septum 35 that separates the interior chamber 65 of the bladder 30 from the fluid supplied by the fluid reservoir 32. The septum 35 is made of a flexible material and may be formed integral with the bladder 30. The bladder chamber 65 is filled with a flowable fill material 66 having a relatively low CTE (coefficient of thermal expansion) and a density selected to provide the bladder 30 with a desired level of stiffness. One side 75 of the septum 35 is exposed to the fluid supplied by fluid reservoir 32. Fluid from the reservoir 56 that is forced against the bladder 30 by the autoclave pressure $P_A$, exerts fluid pressure $P_F$ (FIG. 12) against the septum 35, causing the septum 35 to flex inwardly to the position 35a shown in FIG. 12, thereby pressurizing the fill material 66. Pressurization of the fill material 66 results in an outward pressure 68 being exerted against the composite charge 20.

Figure 13:
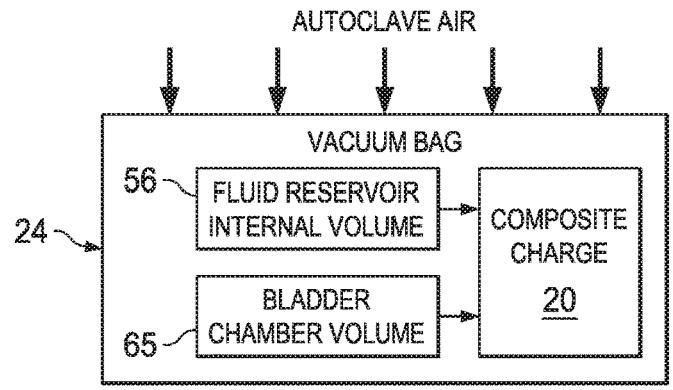
FIG. 13 is an illustration of a diagrammatic view showing the volumes of fluid reaching the composite charge in the event of a leak in the non-vented bladder system.

Referring now to FIG. 13, in the event of a leak in the non-vented bladder system 25 described above, the volume of air within the autoclave 26 (FIG. 1) does not reach the composite charge 20, because the bladder system 25 is sealed beneath the vacuum bag 24. Rather, the total amount of fluid possibly reaching the composite charge 20 in the event of a leak in either the bladder 30 or the fluid reservoir 32 (FIGS. 10-12) is limited to the fluid reservoir interior volume 56 plus the bladder chamber volume 65.

Figure 14:
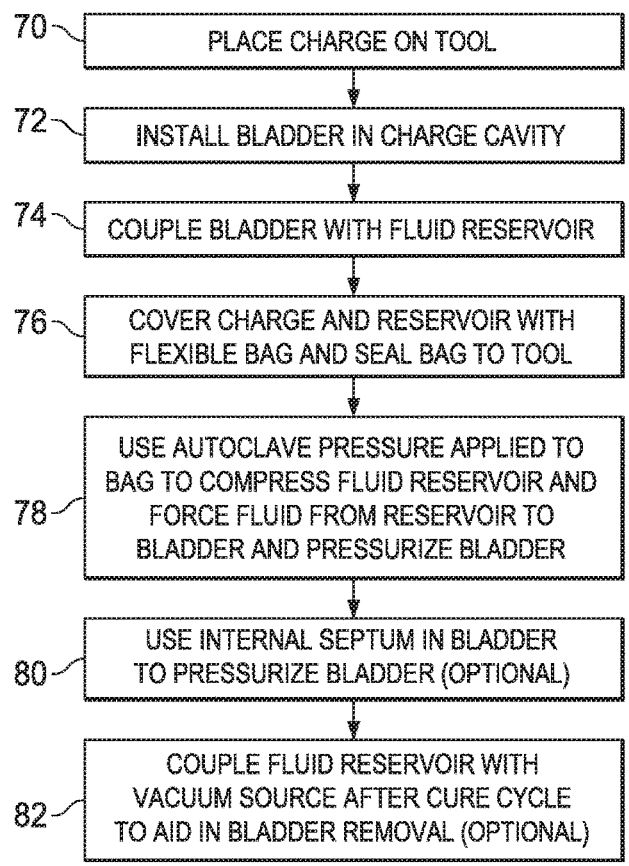
FIG. 14 is an illustration of a flow diagram of a method of autoclave curing a composite part charge having an internal cavity using a non-vented bladder system.

Attention is now directed to FIG. 14 which broadly illustrates the steps of a method for autoclave curing using the non-vented bladder system 25 described above. Beginning at step 70, a composite resin charge 20 is placed on a suitable tool, which may be a cure tool. At 72, a flexible, inflatable bladder 30 is installed in an internal cavity 28 of the charge 20. At 74, the flexible bladder 30 is coupled with a flexible fluid reservoir 32 containing a quantity of fluid. At 76, the composite charge 20 along with the fluid reservoir 32 are covered with a flexible bag 24 such as a vacuum bag, which is then sealed to the cure tool 22. At 78, autoclave pressure $P_A$ is applied to the bag 24 in order to compress the fluid reservoir 32 and force fluid from the reservoir 32 into the bladder 30, thereby pressuring the bladder 30 to react forces applied to the composite charge 20 by autoclave pressure. Optionally, at step 80, an internal septum 35 within the bladder 30 may be employed to transmit pressure to the bladder 30 using the fluid pressure generated by the fluid reservoir 32. Also, optionally at step 82, following curing and removal of the vacuum bag 24, pressure within the fluid reservoir 32 may be relieved to aid in bladder removal, by coupling the fluid reservoir 32 with a suitable vacuum source.

Figure 15:
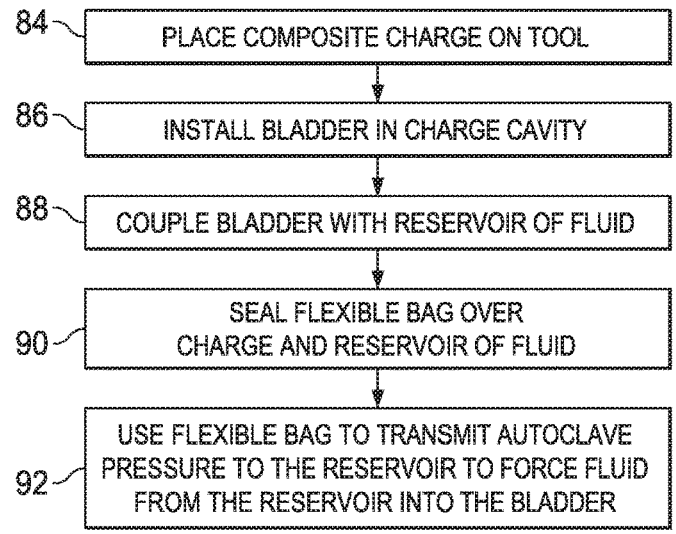
FIG. 15 is an illustration of a flow diagram of an alternate method of autoclave curing a composite part charge using a non-vented bladder system.

An alternate method of curing a composite part charge 20 is shown in FIG. 15. At 84, a composite part charge 20 is placed on a tool 22, and at 86, a bladder 30 is installed in a cavity 28 of the composite part charge 20. The bladder 60 is coupled with a reservoir of fluid 32 at step 88. Next, as shown at step 90, a flexible bag 24 is sealed over the composite part charge 20 and the reservoir of fluid 32. At step 92, the flexible bag 24 is used to transmit autoclave pressure to the reservoir of fluid 32 to force fluid from the reservoir 32 into the bladder 60.

Figure 16:
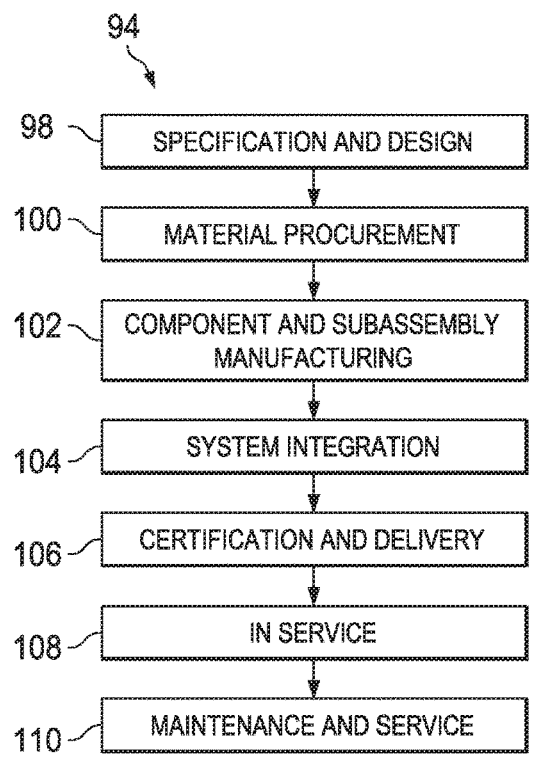
FIG. 16 is an illustration of a flow diagram of aircraft production and service methodology.

Embodiments of the disclosure may find use in a variety of potential applications, particularly in the transportation industry, including for example, aerospace, marine, automotive applications and other application where autoclave curing of composite parts may be used. Thus, referring now to FIGS. 16 and 17, embodiments of the disclosure may be used in the context of an aircraft manufacturing and service method 94 as shown in FIG. 16 and an aircraft 96 as shown in FIG. 16. Aircraft applications of the disclosed embodiments may include, for example, without limitation, curing of stiffener members such as, without limitation beams, spars and stringers, to name only a few. During pre-production, exemplary method 94 may include specification and design 98 of the aircraft 96 and material procurement 100. During production, component and subassembly manufacturing 102 and system integration 104 of the aircraft 96 takes place. Thereafter, the aircraft 96 may go through certification and delivery 96 in order to be placed in service 108. While in service by a customer, the aircraft 96 is scheduled for routine maintenance and service 110, which may also include modification, reconfiguration, refurbishment, and so on.

Each of the processes of method 94 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

Figure 17:
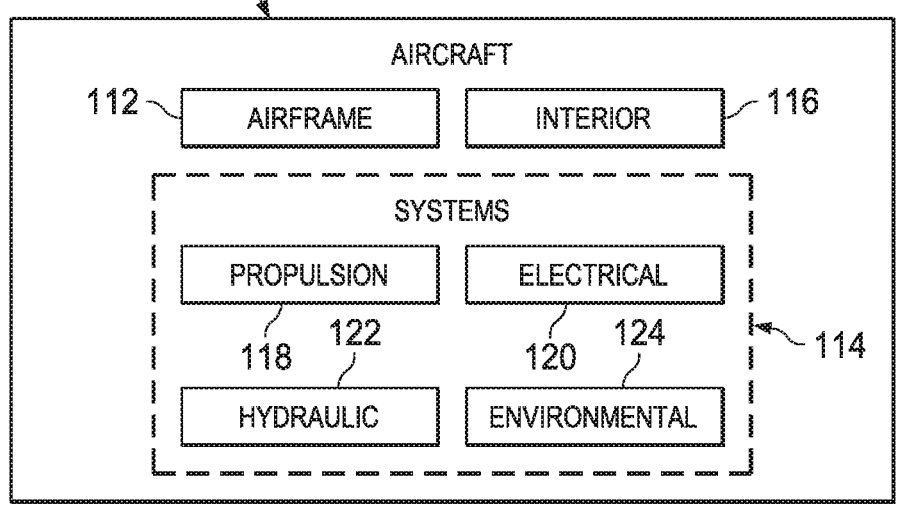
FIG. 17 is an illustration of a block diagram of an aircraft.

As shown in FIG. 17, the aircraft 96 produced by exemplary method 94 may include an airframe 112 with a plurality of systems 114 and an interior 116. Examples of high-level systems 114 include one or more of a propulsion system 118, an electrical system 120, a hydraulic system 122, and an environmental system 124. Any number of other systems may be included. Although an aerospace example is shown, the principles of the disclosure may be applied to other industries, such as the marine and automotive industries.

Systems and methods embodied herein may be employed during any one or more of the stages of the production and service method 94. For example, components or subassemblies corresponding to production process 102 may be fabricated or manufactured in a manner similar to components or subassemblies produced while the aircraft 96 is in service. Also, one or more apparatus embodiments, method embodiments, or a combination thereof may be utilized during the production stages 102 and 104, for example, by substantially expediting assembly of or reducing the cost of an aircraft 96. Similarly, one or more of apparatus embodiments, method embodiments, or a combination thereof may be utilized while the aircraft 96 is in service, for example and without limitation, to maintenance and service 110.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of autoclave curing a composite charge having an internal cavity, comprising:
   placing the composite charge on a tool;
   installing a bladder within the cavity;
   coupling the bladder with a reservoir of fluid;
   sealing a flexible bag over the composite charge and the reservoir; and
   using the flexible bag to transmit autoclave pressure to the reservoir to force fluid from the reservoir into the bladder.

2. The method of claim 1, wherein coupling the bladder with the reservoir includes attaching the bladder to the reservoir before the bladder is installed in the cavity.

3. The method of claim 1, wherein sealing the bag includes sealing the bag to the tool.

4. The method of claim 1, further comprising:
   stiffening the bladder by filling the bladder with a fill material, and
   separating the fill material from the fluid by placing a septum in the bladder.

5. The method of claim 1, further comprising:
   using a vacuum to draw the flexible bag down against sides of the reservoir.

6. The method of claim 1, further comprising:
   removing the flexible bag from the composite charge and the reservoir after the composite charge has been cured; and
   relieving pressure within the bladder by porting the reservoir to a vacuum source after the flexible bag has been removed.

7. A method of autoclave curing a composite part charge having an internal cavity, comprising:
   supporting the composite part charge within the autoclave; and
   pressurizing a bladder within the internal cavity using autoclave pressure to force fluid from a fluid reservoir into the bladder.

8. The method of claim 7, further wherein using the autoclave pressure to force the fluid from the fluid reservoir into the bladder includes:
   evacuating a vacuum bag sealed over the fluid reservoir, and
   using the bag to transmit the autoclave pressure to the fluid reservoir.

* * * * *